G. E. LEWIS.
EGG SEPARATOR.
APPLICATION FILED NOV. 20, 1908.
966,933.
Patented Aug. 9, 1910.
2 SHEETS—SHEET 1.
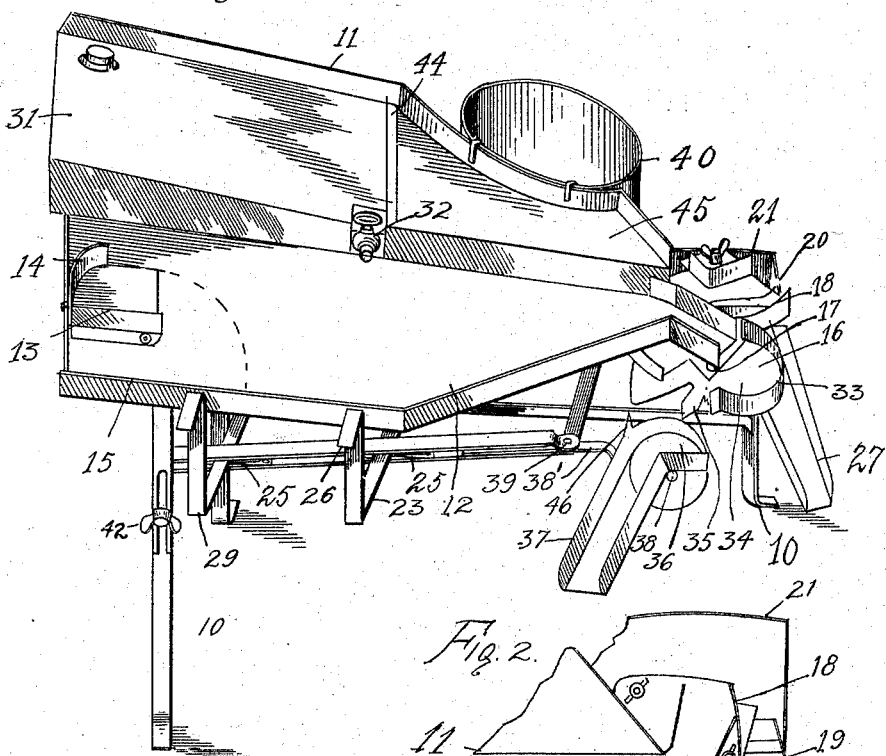
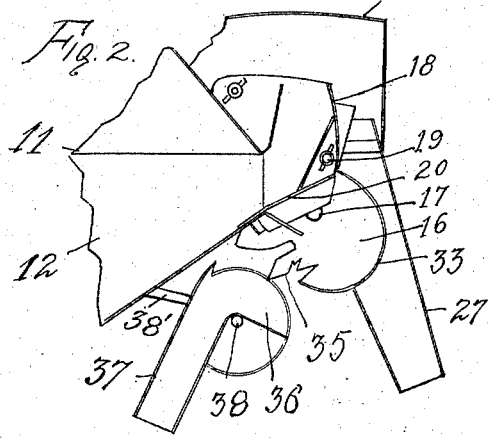
Witnesses
J. A. Ellsworth.
A. W. Little
Inventor
George E. Lewis
By S. Arthur Baldwin.
Attorney

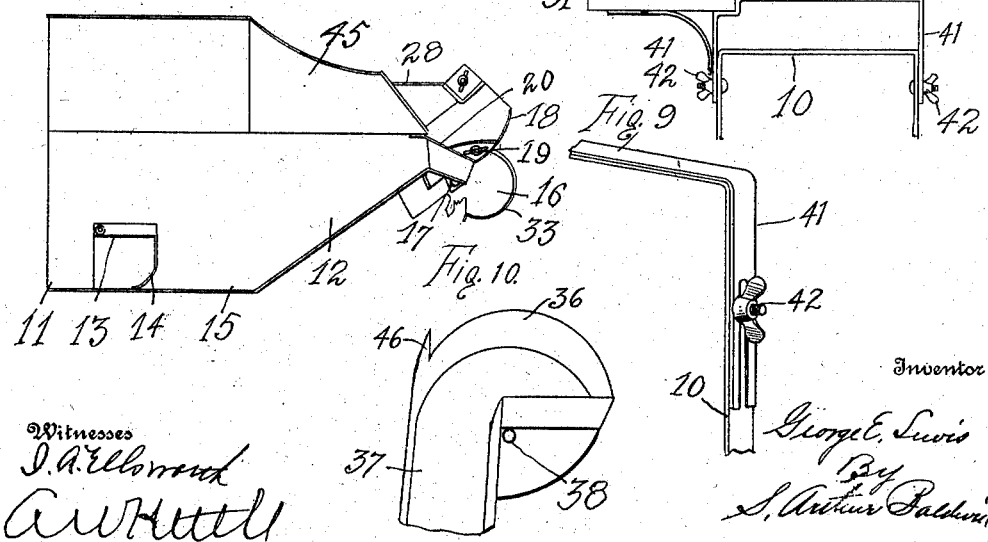

UNITED STATES PATENT OFFICE.

GEORGE E. LEWIS, OF JAMESTOWN, NEW YORK.

EGG-SEPARATOR.

966,933.   Specification of Letters Patent.   Patented Aug. 9, 1910.

Application filed November 20, 1908. Serial No. 463,516.

*To all whom it may concern:*

Be it known that I, GEORGE E. LEWIS, a citizen of the United States, resident of Jamestown, county of Chautauqua, and State of New York, have invented a new and useful Egg-Separator, of which the following, taken in connection with the accompanying drawing, is a full, clear, and exact description.

The invention relates to devices for detecting the quality of the egg and for separating the yolk from the albuminous portion; and the improvement consists, first in providing a broad chute over which the broken egg must pass, with means for detaining the egg upon said chute for inspection if desired and added means for deflecting the course of the egg should it be bad; second, to provide means for automatically separating the yolks from the albumen; and third, to provide means for passing the eggs over the chute to a receptacle without separating the yolk from the albumen when so desired.

The detection of bad eggs is one of the principal objects of this machine. It is obvious that the egg as it starts out over the surface of the chute in running down the same will give plenty of time for the operator to see at a glance whether it is a bad or good egg and there could be no excuse for allowing a bad egg to pass in among the good eggs as often happens in bakeries at the present time. For this reason the eggs that are not to be separated should be broken and allowed to pass over the chute in the manner hereinafter described so that all bad eggs can be cut out.

In the drawings, Figure 1 is a perspective view of the egg separator, in position for separating the yolk and whites. Fig. 2 is a detail view of the separating portion of the mechanism in position for deflecting a bad egg. Fig. 3 is a similar view of said mechanism in position for non-separation of the egg. Fig. 4 is a plan view of the supporting frame and levers, and delivery spouts, the top portion being removed. Fig. 5 is a detail of the catches for controlling the levers. Fig. 6 is a plan view of the under side of the top portion; and Fig. 7 is a plan view of the upper side of said top portion; and Fig. 8 is an elevation of the rear end of said top portion showing the connection of the supporting frame; and Fig. 9 is a detail of the attachment of the rear end of the top portion to the supporting frame. Fig. 10 is a detail of the knife for separating the yolk from the albumen.

Similar numerals refer to corresponding parts in the several views.

The numeral 10 indicates the supporting frame.

The numeral 11 indicates the separator top.

Frame 10, on account of the chute form of the separator top 11 preferably stands upon three legs, the broad rear end having two legs and the lower end of the chute requiring only one.

The separator top 11 comprises the broad flat inclined chute 12 which has at its upper end the egg breaker 13, which consists of a flat bottom portion having a vertical flange 13 upon which the egg shell is broken. Flange 13 extends around at 14 so as to form a receptacle or detention cup, the bottom being pivotally attached to chute 12 so that it may be turned, as shown in dotted line in Fig. 1, and solid line in Fig. 7, so that the flange portion 14 forms a receptacle with the side flange 15 of chute 12, to detain an egg therein for inspection after being broken. After inspection the part 14 may be turned pivotally sidewise so as to release the egg from the open side of the cup down the chute.

The mouth of the lower end of the chute 12 is controlled by pivotally attached gates so that the egg may be turned in any one of three different directions. These gates consist of the gate 16 which is pivotally attached at 17, and the gate 18 which is pivotally attached at 19. Gate 18 has the flange 20 which forms one side of the mouth of the chute 12 to turn the egg toward the gate 16 or toward the gate 18 according as flange 20 is turned in the different directions. For example, in Figs. 1 and 3, flange 20 of gate 18 is turned so as to deflect the egg into part 16, and in Fig. 2, flange 20 is turned to deflect the egg into gate 18 and the receptacle 21, this arrangement being provided for the separation of bad eggs.

In order to give the operator quick control over gates 16 and 18 so that they may be instantly turned in the desired direction link 22 is pivotally attached to gate 16 at one end and at the other to a lever 23, which lever is controlled by suitable spring 24 and spring catch 25, the upper end 26 being turned outwardly so that when the gate 16 is set for separating the eggs, as shown in Fig. 1, the lever 23 will be caught in the spring catch 25 and the instant it is desired to stop the separation of the eggs, the upper end 26 may be struck with the hand pushing it downward and releasing it, the spring 24 causing the gate 16 to turn into the position shown in Fig. 3 and allowing the eggs to pass through into the spout or chute 27 and which leads to a suitable receptacle. Should the operator conclude that he wishes more eggs separated, he simply pulls the lever back to the position shown in Figs. 1 and 4, and continues breaking the eggs.

To turn the gate 18 a link 28 is pivotally attached to the under side of said gate at one end and at the other to the end of a lever 29 which has a spring 30 and catch 25, to control the same in much the same manner as lever 23. Thus, for example when a bad egg is detected even though it is nearing the mouth of the chute 12, the lever 29 may be struck instantly, turning gate 18 and changing flange 20 from one side of the mouth of the chute to the opposite or into the position shown in Fig. 2, thereby deflecting the egg into the receptacle 21.

A water can 31 is provided at one side of chute 12 having a spigot 32 on a level with the bottom of the chute so that by turning the valve the water will flow out over the surface of the bottom of the chute, thereby thoroughly flooding and cleansing the same from a bad egg.

The separation of the yolk from the white or albuminous portion of the egg is accomplished by the following mechanism. Gate 16 has a curved flange 33 which is cup shaped and so placed on gate 16 as that when in the position for separating the eggs, shown in Fig. 1, the flange 33 extends around in a cup shape before the mouth of the bottom of the chute 12 and provides an exit at one side for the egg. The bottom portion 34 of the gate 16 at the exit is formed with a central tongue 35 having cuts each side of it to allow the albuminous portion of the egg to flow through each side of tongue 35. The small cut in the side of tongue 35 is to lead or start the albumen more quickly down over the edge of the tongue. The yolk portion being tougher, passes on over tongue 35 into the semi-cup shaped end 36 of a chute 37 which is pivotally mounted at 38 on an extension 38′ of frame 10. The rear flanged side of end 36 has a knife 46 which also aids in cutting the albuminous portion of the egg from the yolk. As the yolk hangs down chute 37 and the albumen hangs over the flanged side of end 36 the knife 46 separates the two even in the toughest eggs.

The operation of the device is as follows: The eggs are broken by being struck on the raised flange 13 and the contents of the shell are allowed to fall upon chute 12 spreading out over its surface so that it can be instantaneously inspected. When one is doubtful as to the quality of the eggs, it is better to turn the detention cup 14, as shown in Fig. 7, so that a more careful inspection of the egg may be made as will be readily understood. The separation of the yolks from the whites is accomplished after the above described inspection has been made. The yolk being somewhat heavier than the albumen flows ahead of the albuminous portion of the egg into the cup shaped part 33 and is detained there while the thinner albuminous portion flows out through the exit at 34 and passes down to a receptacle immediately beneath said exit. The yolk, following tardily after and being tougher, passes over tongue 35 into cup 36, the remaining portion of the albumen being cut cleanly form the yolk by the rear flanged side of the part 36 and knife 46, after which the yolk passes down chute 37 to a receptacle and the albumen drops into a separate receptacle. The peculiar shaped tongue 35 with the ragged cuts each side of the same is thus seen to be an important factor also in the separation of the yolk from the albumen. Chute 37 is pivotally attached at 38 on the extension 38′ of the frame 10 in order that the chute may be adjusted to exactly the correct position to finish the separation of the albumen from the yolk and leave a clean yoke. The extension 38′ on which the chute 37 is pivotally attached is also pivotally attached to the frame at 39, so that the chute may be moved farther away from or closer to tongue 35. The parts may thus be adjusted to the exact position necessary to accomplish the purpose of quick or slow separation. Fresh eggs will separate quickly, and storage eggs much slower; hence the parts must be adjusted to accommodate this movement. As the eggs are broken on the vertical flange 13 and the contents of the shell are allowed to fall upon the chute 12, it is apparent that a certain amount of the albumen will continue to drip from the shell. A receptacle 40 is placed for the shells so that the operator must pass the shell across the broad top 11 of the chute, thereby allowing the dripping albumen from the shells to fall upon the chute and pass down the same.

The separator top 11 is given a suitable inclination at the rear end by means of the downward extensions 41, as shown in Figs. 1, 8 and 9. The lower ends of extensions 41 are slotted and engage a bolt and thumb nut 42 at each side on the uprights of frame 10 so that the rear end of top 11 may be adjusted to give the desired inclination for the quick or slow separation herein before described. The front end or mouth of the chute rests upon the frame. The pivotal bolt 19 extends through a hole 43 on the frame, being screwed into the same firmly and attaching the front end in position so that it can not move. It is obvious, however, that with this attachment the separator top 11 may be quickly and easily removed from the frame 10 by disengaging links 22 and 28 and unscrewing the thumb nuts of bolts 19 and 41, so that the separator top may be thoroughly cleansed. Toward this end the water can 31 is made removable, the plan view shown in Fig. 7 not containing the water can. The edge 44 of can 31 is provided with a flange which laps the surface of the raised portion 45 of the chute, which raised portion inclines toward the main portion 12 as does also the upper surface of the water can 31 so that the portions of eggs dripping upon said surface will flow down into the chute 12. In regard to this inspection it should be realized that there are many different qualities of eggs. They are divided usually into the two main classes, fresh eggs and storage eggs. Eggs whose quality have become impaired, however, will be found in both of these classes and they grade all the way from the storage egg which is just beginning to be slightly stale, the quality showing by the wrinkled yolk, through the different degrees of badness to the egg which all bakers abhor, the so called hay egg. It has a clear albumen of a greenish tinge, but otherwise looks to be a good egg. One hay egg will spoil a gallon of good eggs. Or, if allowed to pass into the baking will add its bad flavor to any amount of baked goods. It is therefore apparent that the time for inspection allowed in the broad chute 12 is an essential part of this construction.

I claim as new:

1. An egg separator comprising an inclined chute having a side flange, a receptacle pivotally mounted on said chute having a lateral opening which may be closed by turning against said side flange, and a projecting side on said receptacle to form an egg breaker.

2. An egg separator comprising an inclined chute or table, a cup at the mouth of said chute to receive the egg, said cup having a mouth with a central tongue for the yolk to pass over and openings each side of said tongue for the albumen.

3. An egg separator comprising an inclined chute or table, a cup at the mouth of said chute to receive the egg, said cup having a mouth with a central tongue for the yolk to pass over, and openings each side of said tongue for the albumen, said central tongue having a small notch in its edge to quickly lead the albumen down over the edge of said tongue.

4. An egg separator comprising an inclined chute or table, a cup-shaped gate pivotally mounted at the mouth of said chute, said cup-shaped gate having a mouth on each of its opposite sides which the operator may choose, and means at one of said mouths for separating the yolk of the egg from the albumen.

5. An egg separator comprising an inclined chute or table, a cup-shaped gate pivotally mounted at the mouth of said chute and having an opening in the side thereof for the egg to pass out, a second chute having a cup-shaped rear end at a spaced distance from said opening in said cup-shaped gate to receive the yolk and complete the separation of the albumen.

6. An egg separator comprising a frame, a top on said frame, a chute on said top having an outlet at its lower end, a gate pivoted to said top to control said outlet, a second gate pivoted on said frame beneath said outlet, said second gate having two outlets, and means at one of said second gate outlets for separating the yolk from the albumen.

7. An egg separator comprising a frame having spring levers pivotally mounted thereon, a top adjustably mounted on said frame, a chute on said top, gates pivotally attached at the mouth of said chute to control the same, said gates having connecting links with said spring levers to operate said gates, and a cup-shaped gate having suitable means for the separation of the eggs, substantially as and for the purpose specified.

8. An egg separator comprising a suitable frame, a table having a chute thereon adjustably mounted on said frame at an incline, an egg retainer pivotally mounted on said chute and having a flanged edge thereon, and a plurality of gates at the mouth of said chute to control the same and separate the eggs.

9. An egg separator comprising a frame having spring levers pivotally mounted thereon, a top adjustably mounted on said frame, a chute on said top, gates pivotally attached at the mouth of said chute to control the same, said gates having connecting links with said spring levers to operate said gates, a gate having a mouth with a tongue therein, a chute pivotally mounted on said frame beneath said tongue and adjustable thereto, and a rear curved side and knife to finish the separation of the eggs, substantially as and for the purpose specified.

In testimony whereof I have signed my name to this specification in the presence of two subscribing witnesses.

GEORGE E. LEWIS.

Witnesses:
A. W. KETTLE,
I. A. ELLSWORTH.